United States Patent
Huang (10) Patent No.: US 11,514,580 B2
(45) Date of Patent: Nov. 29, 2022

(54) IMAGE PROCESSING CIRCUIT AND METHOD

(71) Applicant: REALTEK SEMICONDUCTOR CORPORATION, Hsinchu (TW)

(72) Inventor: Yu-Shiang Huang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 234 days.

(21) Appl. No.: 17/002,804

(22) Filed: Aug. 26, 2020

(65) Prior Publication Data
US 2021/0097693 A1 Apr. 1, 2021

(30) Foreign Application Priority Data
Sep. 26, 2019 (TW) .................. 108134883

(51) Int. Cl.
*G06T 7/13* (2017.01)
*G06V 10/44* (2022.01)
(Continued)

(52) U.S. Cl.
CPC ............... *G06T 7/13* (2017.01); *G06V 10/44* (2022.01); *G06V 10/50* (2022.01); *G06V 10/60* (2022.01); *G06V 10/467* (2022.01); *G06V 10/48* (2022.01)

(58) Field of Classification Search
CPC .......... G06T 7/13; G06V 10/44; G06V 10/60; G06V 10/467; G06V 10/48; G06V 10/50
See application file for complete search history.

(56) References Cited

FOREIGN PATENT DOCUMENTS

| EP | 3375682 A1 * | 9/2018 | .......... B60W 40/112 |
| WO | WO-2018213721 A1 * | 11/2018 | ............ C12M 33/00 |

OTHER PUBLICATIONS

Syed, N.M., "Edge detection in images: how to derive the Sobel operator," 2018, Computer vision, pp. 1-10. (Year: 2018).*

* cited by examiner

*Primary Examiner* — Ping Y Hsieh
*Assistant Examiner* — Daniella M. DiGuglielmo
(74) *Attorney, Agent, or Firm* — WPAT, PC (57) ABSTRACT

An image processing circuit capable of detecting an edge component includes: a selecting circuit acquiring the brightness values of pixels of an image according to the position of a target pixel and a processing region, wherein the pixels include N horizontal lines and M vertical lines; a brightness-variation calculating circuit generating N horizontal-line-brightness-variation values according to brightness variation of the N horizontal lines, and generating M vertical-line-brightness-variation values according to brightness variation of the M vertical lines; a brightness-variation determining circuit choosing a horizontal-line-brightness-variation representative value among the N horizontal-line-brightness-variation values, choosing a vertical-line-brightness-variation representative value among the M vertical-line-brightness-variation values, and choosing a brightness-variation representative value between the two representative values; an energy-variation calculating circuit generating an energy-variation value according to the brightness values of the pixels; and an edge-score calculating circuit generating an edge score of the target pixel according to the brightness-variation representative value and energy-variation value.

20 Claims, 4 Drawing Sheets

(51) Int. Cl.
*G06V 10/60* (2022.01)
*G06V 10/50* (2022.01)
*G06V 10/46* (2022.01)
*G06V 10/48* (2022.01)

IMAGE PROCESSING CIRCUIT AND METHOD

BACKGROUND OF THE INVENTION

1. Field of the Invention

The present disclosure relates to an image processing circuit and method, especially to an image processing circuit and method capable of detecting an edge component of a pixel of an image.

2. Description of Related Art

Figure 1:
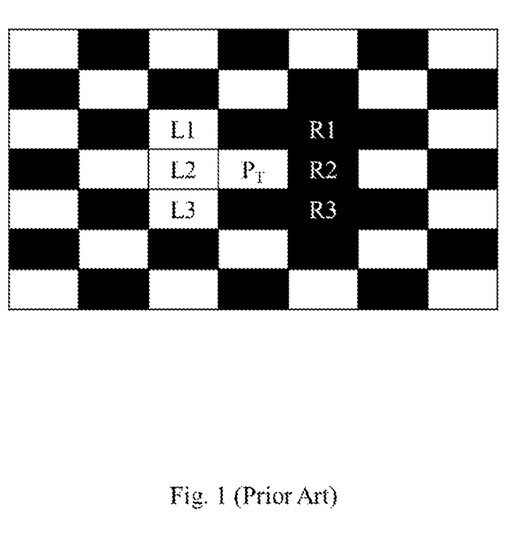
FIG. 1 illustrates an example of how a conventional Sobel mask makes a mistake on edge detection.
Figure 2:
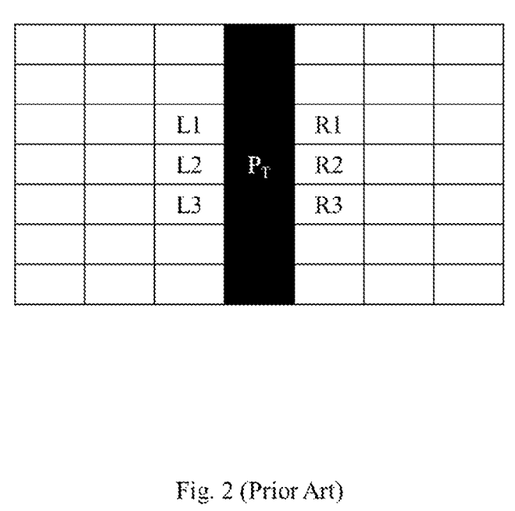
FIG. 2 illustrates another example of how a conventional Sobel mask makes a mistake on edge detection.

A Sobel mask is usually used for detecting the edge of an object in an image, but a general Sobel mask merely uses a few pixels of an image for edge detection and thus the result of the edge detection may be inaccurate. For example, a Sobel mask uses the brightness values L1, L2, and L3 of three pixels on the left of a target pixel $P_T$ and uses the brightness values R1, R2, and R3 of three pixels on the right of the target pixel $P_T$ to detect whether the target pixel $P_T$ is on a straight line; if the difference between the sum of L1, 2×L2, and L3 and the sum of R1, 2×R2, and R3 is greater than a threshold, the Sobel mask determines that the target pixel $P_T$ is on the straight line. However, if the target pixel $P_T$ is at a region where the brightness values of pixels are irregular as shown in FIG. 1, in a circumstance that all of the brightness values L1, L2, and L3 are high brightness values (e.g., brightness values of white pixels) and all of the brightness values R1, R2, and R3 are low brightness values (e.g., brightness values of black pixels), the Sobel mask will erroneously find that the target pixel $P_T$ is on a straight line. In addition, if the target pixel $P_T$ is on an extremely thin black line as shown in FIG. 2, in a circumstance that all of the brightness values L1, L2, L3, R1, R2, and R3 are brightness values of white pixels, the Sobel mask will erroneously find that the target pixel $P_T$ is not on a straight line. In order to improve the accuracy of the aforementioned edge detection with a Sobel mask, a conventional image processing circuit can take pixels around the target pixel $P_T$ (e.g., the pixels within several 3×3 windows neighboring the target pixel $P_T$) into consideration to determine whether a line exists and thereby determine whether the target pixel $P_T$ is on a straight line. However, if the image processing circuit takes more pixels into consideration, it needs more memory to store the pixels, and this leads to the increase of cost.

SUMMARY OF THE INVENTION

An object of the present disclosure is to provide an image processing circuit and method as an improvement over the prior art.

An embodiment of the image processing circuit of the present disclosure is capable of detecting an edge component of a target pixel of an image and includes a selecting circuit, a brightness-variation calculating circuit, a brightness-variation determining circuit, an energy-variation calculating circuit, and an edge-score calculating circuit. The selecting circuit is configured to acquire brightness values of select pixels of the image according to a position of the target pixel and a processing region, wherein the select pixels of the image includes N horizontal lines and M vertical lines, and each of the N and the M is an integer greater than one. The brightness-variation calculating circuit is configured to generate N horizontal-line-brightness-variation values according to brightness variation of each of the N horizontal lines and generate M vertical-line-brightness-variation values according to brightness variation of each of the M vertical lines. The brightness-variation determining circuit is configured to choose a horizontal-line-brightness-variation representative value among the N horizontal-line-brightness-variation values, choose a vertical-line-brightness-variation representative value among the M vertical-line-brightness-variation values, and choose a brightness-variation representative value between the horizontal-line-brightness-variation representative value and the vertical-line-brightness-variation representative value. The energy-variation calculating circuit is configured to generate an energy-variation value according to the brightness values of the select pixels. The edge-score calculating circuit is configured to generate an edge score of the target pixel according to the brightness-variation representative value and the energy-variation value, wherein the edge score of the target pixel is indicative of the amount of the edge component of the target pixel.

An embodiment of the image processing method of the present disclosure is capable of detecting an edge component of a target pixel of an image, and includes the following steps: acquiring characteristic values of select pixels of the image according to a position of the target pixel and a processing region, wherein the select pixels of the image includes N horizontal lines and M vertical lines, and each of the N and the M is an integer greater than one; generating N horizontal-line-characteristic-variation values according to characteristic variation of each of the N horizontal lines and generating M vertical-line-characteristic-variation values according to characteristic variation of each of the M vertical lines; determining a horizontal-line-characteristic-variation representative value according to the N horizontal-line-characteristic-variation values, determining a vertical-line-characteristic-variation representative value according to the M vertical-line-characteristic-variation values, and determining a characteristic-variation representative value according to the horizontal-line-characteristic-variation representative value and the vertical-line-characteristic-variation representative value; generating an energy-variation value according to the characteristic values of the select pixels; and generating an edge score of the target pixel according to the characteristic-variation representative value and the energy-variation value, wherein the edge score of the target pixel is indicative of the amount of the edge component of the target pixel.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present disclosure discloses an image processing circuit and method capable of detecting an edge of an object in an image in a cost-effective manner.

Figure 3:
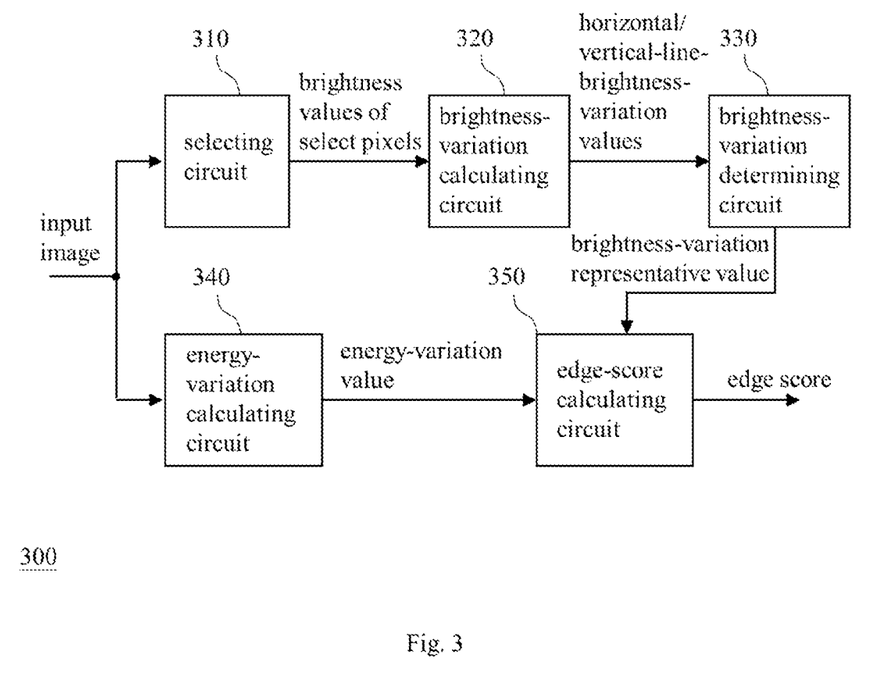
FIG. 3 shows an embodiment of the image processing circuit of the present disclosure.

FIG. 3 shows an embodiment of the image processing circuit of the present disclosure. The image processing circuit 300 of FIG. 3 is capable of detecting an edge component of a target pixel of an input image and includes a selecting circuit 310, a brightness-variation calculating circuit 320, a brightness-variation determining circuit 330, an energy-variation calculating circuit 340, and an edge-score calculating circuit 350.

Please refer to FIG. 3. The selecting circuit 310 is configured to acquire brightness values of select pixels of the input image for edge detection according to the position of the target pixel and a processing region; in the embodiment of FIG. 3, the select pixels fall within the processing region and form a pixel array. Table 1 shows an embodiment of the pixel array (e.g., a 5×5 pixel array at which the target pixel is centered); each cell of Table 1 stands for a pixel, the variable "x" and the suffix thereof denote abscissa, the variable "y" and the suffix thereof denote ordinate, $(x_0,y_0)$ stands for the target pixel, and the value $b_{i,j}$ stands for a brightness value of a pixel $(x_i,y_j)$. Table 2 shows another embodiment of the pixel array (e.g., a 9×9 pixel array at which the target pixel is centered), and the main difference between Table 1 and Table 2 is that the select pixels of Table 2 are spaced at intervals and each blank cell of Table 2 stands for a pixel that is not acquired/used for edge detection; in this case, the selecting circuit 310 can not only refer to the position of the target pixel and the processing region but also refer to a predetermined sampling interval to acquire the brightness values of the select pixels. Those having ordinary skill in the art can appreciate that each of the processing region, the predetermined sampling interval, and the position of the target pixel can optionally be adjusted in accordance with the demand for implementation.

Please refer to FIG. 3. The brightness-variation calculating circuit 320 is configured to generate N horizontal-line-brightness-variation values according to brightness variation of each of the N horizontal lines and generate M vertical-line-brightness-variation values according to brightness variation of each of the M vertical lines. In an exemplary implementation, the brightness-variation calculating circuit 320 performs the following steps 1-4 to obtain the N horizontal-line-brightness-variation values and performs the following steps 5-8 to obtain the M vertical-line-brightness-variation values. The steps 1-8 are described in detail below:

Step 1: calculating a brightness difference between every two adjacent horizontal-line pixels of the $X^{th}$ horizontal line and thereby obtaining a plurality of horizontal-line brightness differences of the $X^{th}$ horizontal line, wherein the X is a positive integer equal to or smaller than the N. For example, if the brightness-variation calculating circuit 320 calculates a brightness difference between every two adjacent horizontal-line pixels of the horizontal line (i.e., $(x_{i=-2\sim2}, y_{j=0})$) of Table 2 including the target pixel $(x_0,y_0)$, the brightness-variation calculating circuit 320 will figure out four differences $[b_{-2,0}-b_{-4,0}]$, $[b_{0,0}-b_{-2,0}]$, $[b_{2,0}-b_{0,0}]$, and $[b_{4,0}-b_{2,0}]$ as the horizontal-line brightness differences of this horizontal line. The horizontal-line brightness differences of the other horizontal lines can be derived in the above-mentioned manner.

Step 2: summing up all positive number(s) of the plurality of horizontal-line brightness differences of the $X^{th}$ horizontal line and thereby generating an upward horizontal-line-brightness-variation value of the $X^{th}$ horizontal line. For example, if the brightness values $b_{-4,0}$, $b_{-2,0}$, $b_{0,0}$, $b_{2,0}$, and $b_{4,0}$ are 1, 2, 3, 4, and 2 respectively, Step 1 can get four horizontal-line brightness differences as follows:

TABLE 1

| | | | | |
|---|---|---|---|---|
| $(x_{-2}, y_{-2}) = b_{-2,-2}$ | $(x_{-1}, y_{-2}) = b_{-1,-2}$ | $(x_0, y_{-2}) = b_{0,-2}$ | $(x_1, y_{-2}) = b_{1,-2}$ | $(x_2, y_{-2}) = b_{2,-2}$ |
| $(x_{-2}, y_{-1}) = b_{-2,-1}$ | $(x_{-1}, y_{-1}) = b_{-1,-1}$ | $(x_0, y_{-1}) = b_{0,-1}$ | $(x_1, y_{-1}) = b_{1,-1}$ | $(x_2, y_{-1}) = b_{2,-1}$ |
| $(x_{-2}, y_0) = b_{-2,0}$ | $(x_{-1}, y_0) = b_{-1,0}$ | $(x_0, y_0) = b_{0,0}$ | $(x_1, y_0) = b_{1,0}$ | $(x_2, y_0) = b_{2,0}$ |
| $(x_{-2}, y_1) = b_{-2,1}$ | $(x_{-1}, y_1) = b_{-1,1}$ | $(x_0, y_1) = b_{0,1}$ | $(x_1, y_1) = b_{1,1}$ | $(x_2, y_1) = b_{2,1}$ |
| $(x_{-2}, y_2) = b_{-2,2}$ | $(x_{-1}, y_2) = b_{-1,2}$ | $(x_0, y_2) = b_{0,2}$ | $(x_1, y_2) = b_{1,2}$ | $(x_2, y_2) = b_{2,2}$ |

TABLE 2

| | | | | |
|---|---|---|---|---|
| $(x_{-4}, y_{-4}) = b_{-4,-4}$ | $(x_{-2}, y_{-4}) = b_{-2,-4}$ | $(x_0, y_{-4}) = b_{0,-4}$ | $(x_2, y_{-4}) = b_{2,-4}$ | $(x_4, y_{-4}) = b_{4,-4}$ |
| $(x_{-4}, y_{-2}) = b_{-4,-2}$ | $(x_{-2}, y_{-2}) = b_{-2,-2}$ | $(x_0, y_{-2}) = b_{0,-2}$ | $(x_2, y_{-2}) = b_{2,-2}$ | $(x_4, y_{-2}) = b_{4,-2}$ |
| $(x_{-4}, y_0) = b_{-4,0}$ | $(x_{-2}, y_0) = b_{-2,0}$ | $(x_0, y_0) = b_{0,0}$ | $(x_2, y_0) = b_{2,0}$ | $(x_4, y_0) = b_{4,0}$ |
| $(x_{-4}, y_2) = b_{-4,2}$ | $(x_{-2}, y_2) = b_{-2,2}$ | $(x_0, y_2) = b_{0,2}$ | $(x_2, y_2) = b_{2,2}$ | $(x_4, y_2) = b_{4,2}$ |
| $(x_{-4}, y_4) = b_{-4,4}$ | $(x_{-2}, y_4) = b_{-2,4}$ | $(x_0, y_4) = b_{0,4}$ | $(x_2, y_4) = b_{2,4}$ | $(x_4, y_4) = b_{4,4}$ |

Please refer to FIG. 3 and Tables 1-2. The select pixels that are picked by the selecting circuit 310 include N horizontal lines and M vertical lines. The ordinates of any two pixels in the same horizontal line are the same but the abscissas of any two pixels in the same horizontal line are different; similarly, the abscissas of any two pixels in the same vertical line are the same but the ordinates of any two pixels in the same vertical line are different. The select pixels for edge detection included in Table 1/2 form five horizontal lines (i.e., $(x_{i=-2\sim2}, y_{j=-2})$, $(x_{i=-2\sim2}, y_{j=-1})$, $(x_{i=-2\sim2}, y_{j=0})$, $(x_{i=-2\sim2}, y_{j=1})$, $(x_{i=-2\sim2}, y_{j=2})$; or $(x_{i=-4\sim4}, y_{j=-4})$, $(x_{i=-4\sim4}, y_{j=-2})$, $(x_{i=-4\sim4}, y_{j=0})$, $(x_{i=-4\sim4}, y_{j=2})$, $(x_{i=-4\sim4}, y_{j=4})$) and five vertical lines (i.e., $(x_{i=-2}, y_{j=-2\sim2})$, $(x_{i=-1}, y_{j=-2\sim2})$, $(x_{i=0}, y_{j=-2\sim2})$, $(x_{i=-1}, y_{j=-2\sim2})$, $(x_{i=2}, y_{j=-2\sim2})$; or $(x_{i=-4}, y_{j=-4\sim4})$, $(x_{i=-2}, y_{j=-4\sim4})$, $(x_{i=0}, y_{j=-4\sim4})$, $(x_{i=2}, y_{j=-4\sim4})$, $(x_{i=4}, y_{j=-4\sim4})$), and thus both the N and M are five in Table 1/2; but the present invention is not limited thereto.

$[b_{-2,0}-b_{-4,0}]=(2-1)=(2-1)=+1$; $[b_{0,0}-b_{-2,0}]=(3-2)=+1$; $[b_{2,0}-b_{0,0}]=(4-3)=+1$; and $[b_{4,0}-b_{2,0}]=(2-4)=-2$. Afterwards, Step 2 can sum up all positive number(s) (e.g., 1+1+1=3) of the four horizontal-line brightness differences and thereby generate the upward horizontal-line-brightness-variation value. The upward horizontal-line-brightness-variation value of the other horizontal lines can be derived in the above-mentioned manner.

Step 3: summing up the absolute value(s) of all negative number(s) of the plurality of horizontal-line brightness differences of the $X^{th}$ horizontal line and thereby generating a downward horizontal-line-brightness-variation value of the $X^{th}$ horizontal line. For example, if the four horizontal-line brightness differences $[b_{-2,0}-b_{-4,0}]$, $[b_{0,0}-b_{-2,0}]$, $[b_{2,0}-b_{0,0}]$, and $[b_{4,0}-b_{2,0}]$ calculated with Step 1 are +1, +1, +1, and −2 respectively, Step 3 will sum up the absolute value(s) of all negative number(s) (e.g., |−2|=2)

of the four horizontal-line brightness differences and thereby generate the downward horizontal-line-brightness-variation value. It should be noted that Step 3 can calculate the absolute value of the sum of all the negative numbers or calculate the sum of the absolute values of all the negative numbers as the downward horizontal-line-brightness-variation value; actually, one can use any logical way to calculate the downward horizontal-line-brightness-variation value. The downward horizontal-line-brightness-variation value of the other horizontal lines can be derived in the above-mentioned manner.

Step 4: choosing one of the upward horizontal-line-brightness-variation value of the $X^{th}$ horizontal line and the downward horizontal-line-brightness-variation value of the $X^{th}$ horizontal line as a horizontal-line-brightness-variation value of the $X^{th}$ horizontal line. For example, Step 4 chooses the smaller one between the upward horizontal-line-brightness-variation value of the $X^{th}$ horizontal line and the downward horizontal-line-brightness-variation value of the $X^{th}$ horizontal line as the horizontal-line-brightness-variation value of the $X^{th}$ horizontal line. The horizontal-line-brightness-variation value of the other horizontal lines can be derived in the above-mentioned manner.

Step 5: calculating a brightness difference between every two adjacent vertical-line pixels of the $Y^{th}$ vertical line and thereby obtaining a plurality of vertical-line brightness differences of the $Y^{th}$ vertical line, wherein the Y is a positive integer equal to or smaller than the M. For example, if the brightness-variation calculating circuit 320 calculates a brightness difference between every two adjacent vertical-line pixels of the vertical line (i.e., ($x_{i=0}$, $y_{j=-2-2}$)) of Table 2 including the target pixel ($x_0,y_0$), the brightness-variation calculating circuit 320 will figure out four differences $[b_{0,-2}-b_{0,-4}]$, $[b_{0,0}-b_{0,-2}]$, $[b_{0,2}-b_{0,0}]$, and $[b_{0,4}-b_{0,2}]$ as the vertical-line brightness differences of this vertical line. The vertical-line brightness differences of the other vertical lines can be derived in the above-mentioned manner.

Step 6: summing up all positive number(s) of the plurality of vertical-line brightness differences of the $Y^{th}$ vertical line and thereby generating an upward vertical-line-brightness-variation value of the $Y^{th}$ vertical line. For example, if the brightness values $b_{0,-4}$, $b_{0,-2}$, $b_{0,0}$, $b_{0,2}$, and $b_{0,4}$ are 7, 5, 3, 6, and 2 respectively, Step 5 can get four vertical-line brightness differences as follows: $[b_{-2,0}-b_{-4,0}]=(5-7)=-2$, $[b_{0,0}-b_{-2,0}]=(3-5)=-2$, $[b_{2,0}-b_{0,0}]=(6-3)=+3$, and $[b_{4,0}-b_{2,0}]=(2-6)=-4$. Afterwards, Step 6 can sum up all positive number(s) (e.g., +3=3) of the four vertical-line brightness differences and thereby generate the upward vertical-line-brightness-variation value. The upward vertical-line-brightness-variation value of the other vertical lines can be derived in the above-mentioned manner.

Step 7: summing up the absolute value(s) of all negative number(s) of the plurality of vertical-line brightness differences of the $Y^{th}$ vertical line and thereby generating a downward vertical-line-brightness-variation value of the $Y^{th}$ vertical line. For example, if the four vertical-line brightness differences $[b_{-2,0}-b_{-4,0}]$, $[b_{0,0}-b_{-2,0}]$, $[b_{2,0}-b_{0,0}]$, and $[b_{4,0}-b_{2,0}]$ calculated with Step 5 are −2, −, +3, and −4 respectively, Step 6 will sum up the absolute value(s) of all negative number(s) (e.g., |−2−2−4|=8) of the four vertical-line brightness differences and thereby generate the downward vertical-line-brightness-variation value. It should be noted that Step 7 can calculate the absolute value of the sum of all the negative numbers or calculate the sum of the absolute values of all the negative numbers as the downward vertical-line-brightness-variation value; actually, one can use any logical way to calculate the downward vertical-line-brightness-variation value. The downward vertical-line-brightness-variation value of the other vertical lines can be derived in the above-mentioned manner.

Step 8: choosing one of the upward vertical-line-brightness-variation value of the $Y^{th}$ vertical line and the downward vertical-line-brightness-variation value of the $Y^{th}$ vertical line as a vertical-line-brightness-variation value of the $Y^{th}$ vertical line. For example, Step 8 chooses the smaller one between the upward vertical-line-brightness-variation value of the $Y^{th}$ vertical line and the downward vertical-line-brightness-variation value of the $Y^{th}$ vertical line as the vertical-line-brightness-variation value of the $Y^{th}$ vertical line. The vertical-line-brightness-variation value of the other vertical lines can be derived in the above-mentioned manner.

It should be noted that the aforementioned exemplary implementation is for a better understanding rather than a limitation to the present invention. The brightness-variation calculating circuit 320 can use a known or self-developed algorithm and/or processing method (e.g., weighted algorithm and/or normalization processing method) to generate the N horizontal-line-brightness-variation values and the M vertical-line-brightness-variation values.

Please refer to FIG. 3 and Tables 1-2. The brightness-variation determining circuit 330 is configured to choose a horizontal-line-brightness-variation representative value among the N horizontal-line-brightness-variation values, choose a vertical-line-brightness-variation representative value among the M vertical-line-brightness-variation values, and choose a brightness-variation representative value between the horizontal-line-brightness-variation representative value and the vertical-line-brightness-variation representative value. For example, the brightness-variation determining circuit 300 chooses the maximum one among the N horizontal-line-brightness-variation values as the horizontal-line-brightness-variation representative value, chooses the maximum one among the M vertical-line-brightness-variation values as the vertical-line-brightness-variation representative value, and chooses the smaller one between the horizontal-line-brightness-variation representative value and the vertical-line-brightness-variation representative value as the brightness-variation representative value.

Please refer to FIG. 3 and Tables 1-2. The energy-variation calculating circuit 340 is configured to generate an energy-variation value according to the brightness values of the select pixels picked by the selecting circuit 310. The energy-variation value is used for determining whether the processing region falls within a smooth area of the input image (e.g., a white wall pattern of the input image). For example, the energy-variation calculating circuit 340 generates a calculated value (e.g., the difference between the maximum brightness value and minimum brightness value of the select pixels of the input image) as the energy-variation value according to the maximum brightness value and minimum brightness value of the select pixels of the input image. For another example, the energy-variation calculating circuit 340 performs calculation according to the average of the brightness values of K high-brightness pixels of the select pixels (e.g., K brightness values including the highest brightness value, the second brightness value, . . . , and the $K^{th}$ brightness value which can be obtained by sorting the select pixels by brightness) and the average of the brightness values of K low-brightness pixels of the select pixels (e.g., K brightness values including the lowest brightness value, the second-last brightness value, . . . , and the $K^{th}$-last brightness value which can be obtained by sorting the select pixels by brightness), and thereby generates a calculated value (e.g., the difference between the average of the brightness values of the K high-brightness pixels and the average of the brightness values of the K low-brightness pixels) as the energy-variation value. Those having ordinary skill in the art can derive more examples from the above-mentioned examples, and such modifications fall within the implementation scope of the energy-variation calculating circuit 340.

Please refer to FIG. 3 and Tables 1-2. The edge-score calculating circuit 350 is configured to generate an edge score of the target pixel according to the brightness-variation representative value and the energy-variation value, wherein the edge score of the target pixel is indicative of the amount of the edge component of the target pixel. For example, the edge-score calculating circuit 350 generates a calculated value (e.g., subtracting one and the brightness-variation representative value from the energy-variation value) as the edge score of the target pixel according to the brightness-variation representative value and the energy-variation value. For another example, in order to simplify calculation and/or reduce the demand for memory, the brightness values of the select pixels can be divided by a predetermined number (e.g., 16); in this case, the energy-variation calculating circuit 340 divides the energy-variation value by the predetermined number, and the edge-score calculating circuit 350 subtracts the brightness-variation representative value from the smaller one chosen between "the predetermined number" and "the energy-variation value minus one" to generate the edge score. Those having ordinary skill in the art can derive more examples from the above-mentioned example, and such modifications fall within the implementation scope of the edge-score calculating circuit 350.

a horizontal line is darker than the brightness of the current pixel in the horizontal line) concurrently, and thus some of the five horizontal-line-brightness-variation values, which can be determined by the aforementioned Step 4, of the five horizontal pixel lines are not zero. Therefore, the horizontal-line-brightness-variation representative value (e.g., the maximum one among the five horizontal-line-brightness-variation values) chosen by the brightness-variation determining circuit 330 is not zero. On the other hand, each of the five vertical pixel lines has no upward brightness variation, and thus all of the five vertical-line-brightness-variation values, which can be determined by the aforementioned Step 8, of the five vertical pixel lines are zero. Therefore, the vertical-line-brightness-variation representative value (e.g., the maximum one among the five vertical-line-brightness-variation values) chosen by the brightness-variation determining circuit 330 is zero. Next, the brightness-variation determining circuit 330 chooses one between the horizontal-line-brightness-variation representative value and the vertical-line-brightness-variation representative value (e.g., the smaller one between the two representative values, that is the vertical-line-brightness-variation representative value "0") as the brightness-variation representative value. Afterward, the energy-variation calculating circuit 340 generates the energy-variation value (e.g., the difference "8" between the maximum brightness value "9" and the minimum brightness value "1" of Table 3) according to the brightness values of the select pixels of Table 3. At last, the edge-score calculating circuit 350 uses the brightness-variation representative value (e.g., the vertical-line-brightness-variation representative value "0") and the energy-variation value (e.g., the difference "8") to generate the edge score of the target pixel (e.g., (8−1)−0=7 as described in the preceding paragraph). The edge score can be utilized by a back-end image processing circuit which falls beyond the scope of the present disclosure.

TABLE 3

|  | | | | | | horizontal-line-brightness-variation value |
|---|---|---|---|---|---|---|
| | $(x_{-2},y_{-2}) = 9$ | $(x_{-1},y_{-2}) = 1$ | $(x_0,y_{-2}) = 9$ | $(x_1,y_{-2}) = 1$ | $(x_2,y_{-2}) = 9$ | 16 |
| | $(x_{-2},y_{-1}) = 9$ | $(x_{-1},y_{-1}) = 1$ | $(x_0,y_{-1}) = 9$ | $(x_1,y_{-1}) = 1$ | $(x_2,y_{-1}) = 9$ | 16 |
| | $(x_{-2},y_0) = 5$ | $(x_{-1},y_0) = 1$ | $(x_0,y_0) = 5$ | $(x_1,y_0) = 1$ | $(x_2,y_0) = 5$ | 8 |
| | $(x_{-2},y_1) = 1$ | $(x_{-1},y_1) = 1$ | $(x_0,y_1) = 1$ | $(x_1,y_1) = 1$ | $(x_2,y_1) = 1$ | 0 |
| | $(x_{-2},y_2) = 1$ | $(x_{-1},y_2) = 1$ | $(x_0,y_2) = 1$ | $(x_1,y_2) = 1$ | $(x_2,y_2) = 1$ | 0 |
| vertical-line-brightness-variation value | 0 | 0 | 0 | 0 | 0 | |

Below is described an exemplary implementation for a better understanding. Please refer to Table 3 below. Table 3 shows: the brightness values of select pixels within a 5×5 processing region; five horizontal pixel lines of the select pixels and the horizontal-line-brightness-variation values thereof that are emphasized in bold; and five vertical pixel lines of the select pixels and the vertical-line-brightness-variation values thereof that are emphasized in bold. According to Table 3, some horizontal pixel lines of the select pixels have upward brightness variations (i.e., the brightness of the next pixel in a horizontal line is brighter than the brightness of the current pixel in the horizontal line) and downward brightness variations (i.e., the brightness of the next pixel in It should be noted that the brightness values of the aforementioned embodiments can be replaced by other image characteristic values according to the demand for implementation as long as such implementation is practicable.

Figure 4:
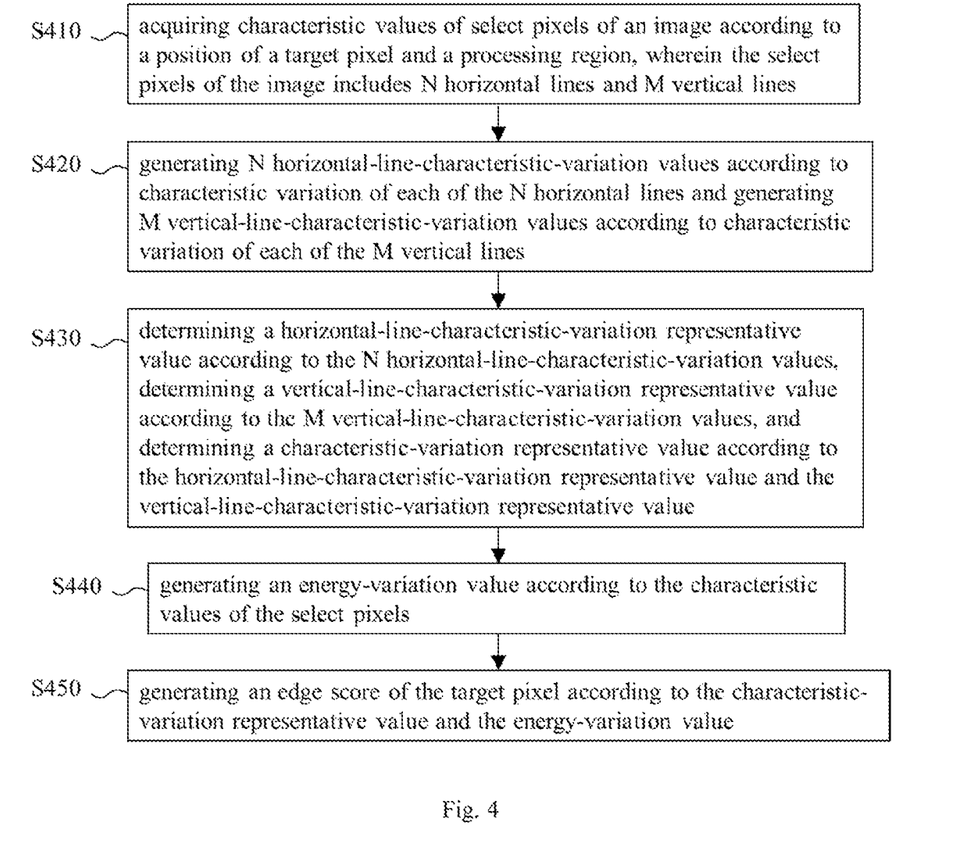
FIG. 4 shows an embodiment of the image processing method of the present disclosure.

FIG. 4 shows an embodiment of the image processing method of the present disclosure. This embodiment is performed by an image processing circuit (e.g., the image processing circuit 300 of FIG. 3) and capable of measuring an edge component of a target pixel of an image. This embodiment includes the following steps:

Step S410: acquiring characteristic values (e.g., brightness values) of select pixels of the image according to a position of the target pixel and a processing region, wherein the select pixels of the image includes N horizontal lines and M vertical lines, and each of the N and the M is an integer greater than one;

Step S420: generating N horizontal-line-characteristic-variation values according to characteristic variation of each of the N horizontal lines and generating M vertical-line-characteristic-variation values according to characteristic variation of each of the M vertical lines;

Step S430: determining a horizontal-line-characteristic-variation representative value according to the N horizontal-line-characteristic-variation values, determining a vertical-line-characteristic-variation representative value according to the M vertical-line-characteristic-variation values, and determining a characteristic-variation representative value according to the horizontal-line-characteristic-variation representative value and the vertical-line-characteristic-variation representative value;

Step S440: generating an energy-variation value according to the characteristic values of the select pixels; and Step S450: generating an edge score of the target pixel according to the characteristic-variation representative value and the energy-variation value.

Since those having ordinary skill in the art can refer to the disclosure of the embodiment of FIG. 3 to appreciate the detail and modification of the embodiment of FIG. 4, which means that the features of the embodiment of FIG. 3 can be applied to the embodiment of FIG. 4 in a reasonable way, repeated and redundant description is omitted here.

To sum up, the present invention can effectively detect the edge of an object in an image in a cost-effective manner.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. An image processing circuit capable of detecting an edge component of a target pixel of an image, comprising:
    a selecting circuit configured to acquire brightness values of select pixels of the image according to a position of the target pixel and a processing region, wherein the select pixels of the image includes N horizontal lines and M vertical lines, and each of the N and the M is an integer greater than one;
    a brightness-variation calculating circuit configured to generate N horizontal-line-brightness-variation values according to brightness variation of each of the N horizontal lines and generate M vertical-line-brightness-variation values according to brightness variation of each of the M vertical lines;
    a brightness-variation determining circuit configured to choose a horizontal-line-brightness-variation representative value among the N horizontal-line-brightness-variation values, choose a vertical-line-brightness-variation representative value among the M vertical-line-brightness-variation values, and choose a brightness-variation representative value between the horizontal-line-brightness-variation representative value and the vertical-line-brightness-variation representative value;
    an energy-variation calculating circuit configured to generate an energy-variation value according to the brightness values of the select pixels; and
    an edge-score calculating circuit configured to generate an edge score of the target pixel according to the brightness-variation representative value and the energy-variation value, wherein the edge score of the target pixel is indicative of the edge component of the target pixel.

2. The image processing circuit of claim 1, wherein the brightness-variation calculating circuit is configured to calculate an upward horizontal-line-brightness-variation value of an $X^{th}$ horizontal line of the N horizontal lines and a downward horizontal-line-brightness-variation value of the $X^{th}$ horizontal line and then choose one of the upward horizontal-line-brightness-variation value and the downward horizontal-line-brightness-variation value as a horizontal-line-brightness-variation value of the $X^{th}$ horizontal line, and the X is a positive integer equal to or smaller than the N; and the brightness-variation calculating circuit is configured to calculate an upward vertical-line-brightness-variation value of a $Y^{th}$ vertical line of the M vertical lines and a downward vertical-line-brightness-variation value of the $Y^{th}$ vertical line and then choose one of the upward vertical-line-brightness-variation value and the downward vertical-line-brightness-variation value as a vertical-line-brightness-variation value of the $Y^{th}$ vertical line, and the Y is a positive integer equal to or smaller than the M.

3. The image processing circuit of claim 2, wherein
    the brightness-variation calculating circuit performs the following steps to obtain the upward horizontal-line-brightness-variation value and the downward horizontal-line-brightness-variation value of the $X^{th}$ horizontal line:
    calculating a brightness difference between every two adjacent horizontal-line pixels of the $X^{th}$ horizontal line and thereby obtaining a plurality of horizontal-line brightness differences;
    summing up all positive number(s) of the plurality of horizontal-line brightness differences and thereby generating the upward horizontal-line-brightness-variation value of the $X^{th}$ horizontal line; and
    summing up absolute value(s) of all negative number(s) of the plurality of horizontal-line brightness differences and thereby generating the downward horizontal-line-brightness-variation value of the $X^{th}$ horizontal line; and
    the brightness-variation calculating circuit performs the following steps to obtain the upward vertical-line-brightness-variation value and the downward vertical-line-brightness-variation value of the $Y^{th}$ vertical line:
    calculating a brightness difference between every two adjacent vertical-line pixels of the $Y^{th}$ vertical line and thereby obtaining a plurality of vertical-line brightness differences;
    summing up all positive number(s) of the plurality of vertical-line brightness differences and thereby generating the upward vertical-line-brightness-variation value of the $Y^{th}$ vertical line; and
    summing up absolute value(s) of all negative number(s) of the plurality of vertical-line brightness differences and thereby generating the downward vertical-line-brightness-variation value of the $Y^{th}$ vertical line.

4. The image processing circuit of claim 2, wherein the brightness-variation calculating circuit chooses a smaller one between the upward horizontal-line-brightness-variation value of the $X^{th}$ horizontal line and the downward horizontal-line-brightness-variation value of the $X^{th}$ horizontal line as the horizontal-line-brightness-variation value of the $X^{th}$ horizontal line, and the brightness-variation calculating circuit chooses a smaller one between the upward vertical-line-brightness-variation value of the $Y^{th}$ vertical line and the downward vertical-line-brightness-variation value of the $Y^{th}$ vertical line as the vertical-line-brightness-variation value of the $Y^{th}$ vertical line.

5. The image processing circuit of claim 1, wherein the brightness-variation determining circuit chooses a maximum one among the N horizontal-line-brightness-variation values as the horizontal-line-brightness-variation representative value, chooses a maximum one among the M vertical-line-brightness-variation values as the vertical-line-brightness-variation representative value, and chooses a smaller one between the horizontal-line-brightness-variation representative value and the vertical-line-brightness-variation representative value as the brightness-variation representative value.

6. The image processing circuit of claim 1, wherein the energy-variation calculating circuit generates the energy-variation value according to a maximum brightness value and a minimum brightness value of the select pixels of the image.

7. The image processing circuit of claim 6, wherein the energy-variation calculating circuit generates the energy-variation value according to a difference between the maximum brightness value and the minimum brightness value.

8. The image processing circuit of claim 1, wherein the edge-score calculating circuit generates the edge score according to a difference between the energy-variation value and the brightness-variation representative value.

9. The image processing circuit of claim 1, wherein the selecting circuit is configured to acquire the brightness values of the select pixels of the image according to the position of the target pixel, a predetermined sampling interval, and the processing region.

10. The image processing circuit of claim 1, wherein the position of the target pixel is at a center of the processing region.

11. An image processing method capable of detecting an edge component of a target pixel of an image, comprising:
acquiring characteristic values of select pixels of the image according to a position of the target pixel and a processing region, wherein the select pixels of the image includes N horizontal lines and M vertical lines, and each of the N and the M is an integer greater than one;
generating N horizontal-line-characteristic-variation values according to characteristic variation of each of the N horizontal lines and generating M vertical-line-characteristic-variation values according to characteristic variation of each of the M vertical lines;
determining a horizontal-line-characteristic-variation representative value according to the N horizontal-line-characteristic-variation values, determining a vertical-line-characteristic-variation representative value according to the M vertical-line-characteristic-variation values, and determining a characteristic-variation representative value according to the horizontal-line-characteristic-variation representative value and the vertical-line-characteristic-variation representative value;
generating an energy-variation value according to the characteristic values of the select pixels; and
generating an edge score of the target pixel according to the characteristic-variation representative value and the energy-variation value, wherein the edge score of the target pixel is indicative of the edge component of the target pixel.

12. The image processing method of claim 11, wherein the characteristic values of the select pixels are brightness values of the select pixels.

13. The image processing method of claim 11, wherein the step of generating the N horizontal-line-characteristic-variation values includes:
calculating an upward horizontal-line-characteristic-variation value of an $X^{th}$ horizontal line of the N horizontal lines and a downward horizontal-line-characteristic-variation value of the $X^{th}$ horizontal line, wherein the X is a positive integer equal to or smaller than the N; and
determining a horizontal-line-characteristic-variation value of the $X^{th}$ horizontal line according to the upward horizontal-line-characteristic-variation value and the downward horizontal-line-characteristic-variation value; and
the step of generating the M vertical-line-characteristic-variation values includes:
calculating an upward vertical-line-characteristic-variation value of a $Y^{th}$ vertical line of the M vertical lines and a downward vertical-line-characteristic-variation value of the $Y^{th}$ vertical line, wherein the Y is a positive integer equal to or smaller than the M; and
determining a vertical-line-characteristic-variation value of the $Y^{th}$ vertical line according to the upward vertical-line-characteristic-variation value and the downward vertical-line-characteristic-variation value.

14. The image processing method of claim 13, wherein the step of calculating the upward horizontal-line-characteristic-variation value and the downward horizontal-line-characteristic-variation value of the $X^{th}$ horizontal line includes:
calculating a characteristic difference between every two adjacent horizontal-line pixels of the $X^{th}$ horizontal line and thereby obtaining a plurality of horizontal-line characteristic differences;
generating the upward horizontal-line-characteristic-variation value of the $X^{th}$ horizontal line according to all positive number(s) of the plurality of horizontal-line characteristic differences; and
generating the downward horizontal-line-characteristic-variation value of the $X^{th}$ horizontal line according to all negative number(s) of the plurality of horizontal-line characteristic differences; and
the step of calculating the upward vertical-line-characteristic-variation value and the downward vertical-line-characteristic-variation value of the $Y^{th}$ vertical line includes:
calculating a characteristic difference between every two adjacent vertical-line pixels of the $Y^{th}$ vertical line and thereby obtaining a plurality of vertical-line characteristic differences;
generating the upward vertical-line-characteristic-variation value of the $Y^{th}$ vertical line according to all positive number(s) of the plurality of vertical-line characteristic differences; and
generating the downward vertical-line-characteristic-variation value of the $Y^{th}$ vertical line according to all negative number(s) of the plurality of vertical-line characteristic differences.

15. The image processing method of claim 13, wherein the step of determining the horizontal-line-characteristic-variation value of the $X^{th}$ horizontal line includes:

choosing a smaller one between the upward horizontal-line-characteristic-variation value of the $X^{th}$ horizontal line and the downward horizontal-line-characteristic-variation value of the $X^{th}$ horizontal line as the horizontal-line-characteristic-variation value of the $X^{th}$ horizontal line; and the step of determining the vertical-line-characteristic-variation value of the $Y^{th}$ vertical line includes:

choosing a smaller one between the upward vertical-line-characteristic-variation value of the $Y^{th}$ vertical line and the downward vertical-line-characteristic-variation value of the $Y^{th}$ vertical line as the vertical-line-characteristic-variation value of the $Y^{th}$ vertical line.

16. The image processing method of claim 11, wherein the step of determining the horizontal-line-characteristic-variation representative value includes:

choosing a maximum one among the N horizontal-line-characteristic-variation values as the horizontal-line-characteristic-variation representative value;

the step of determining the vertical-line-characteristic-variation representative value includes:

choosing a maximum one among the M vertical-line-characteristic-variation values as the vertical-line-characteristic-variation representative value; and the step of determining the characteristic-variation representative value includes:

choosing a smaller one between the horizontal-line-characteristic-variation representative value and the vertical-line-characteristic-variation representative value as the characteristic-variation representative value.

17. The image processing method of claim 11, wherein the step of generating the energy-variation value includes: generating the energy-variation value according to a maximum brightness value and a minimum brightness value of the select pixels of the image.

18. The image processing method of claim 17, wherein the step of generating the energy-variation value includes: generating the energy-variation value according to a difference between the maximum brightness value and the minimum brightness value.

19. The image processing method of claim 11, wherein the step of generating the edge score includes: generating the edge score according to a difference between the energy-variation value and the characteristic-variation representative value.

20. The image processing method of claim 11, wherein the step of selecting the characteristic values of the select pixels of the image includes: acquiring the characteristic values of the select pixels of the image according to the position of the target pixel, a predetermined sampling interval, and the processing region.

\* \* \* \* \*